United States Patent Office 3,318,912
Patented May 9, 1967

3,318,912
PROCESS FOR THE PREPARATION OF
2-PYRONES
Eric J. Y. Scott, Princeton, N.J., assignor to Mobil Oil
Corporation, a corporation of New York
No Drawing. Filed May 28, 1965, Ser. No. 459,994
10 Claims. (Cl. 260—343.2)

This invention relates to the preparation of pyrones, and more particularly to a process by which 2-pyrones can be prepared by the thermal isomerization of 2-furaldehydes.

The 2-pyrones which can be prepared by the process of this invention are also known as alpha-pyrones and may be represented by the following structural formula:

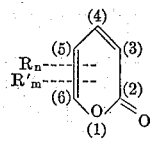

in which R and R' are organic radicals that are stable structurally and against scission from the ring at the reaction conditions of the process of this invention; each R is a monovalent radical linked to ring position 4, 5 or 6; R' is a divalent radical linked to and forming a cyclic, e.g. aromatic, structure with adjacent carbon atoms in two of ring positions 4, 5 and 6; $m$ is zero or one; and $n$ is zero or an integer of one to three when $m$ is zero, and zero or one when $m$ is one. In more specific embodiments in which $n$ is other than zero, each R is a member of the group consisting of the halogens and normal aliphatic, aryl and nitro radicals. In other more specific embodiments in which $m$ is one, R' is a

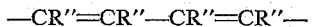

structure which is linked to and forms a benzenoid structure with the carbon atoms in ring positions 5 and 6, and in which each R" is a member of the group consisting of hydrogen and monovalent organic radicals that are stable structurally and against scission from the benzenoid ring at the reaction conditions of the process of this invention, e.g. the halogens and normal aliphatic, aryl or nitro radicals.

Any of the 2-pyrones obtainable by the process of this invention can be readily converted, by any of a variety of known ring-opening processes, to a monomer containing at least two double bonds and a carboxylic group, e.g. 2,4-pentadienoic acid ($\beta$-vinyl acrylic acid). Such monomers can be easily polymerized as homopolymers or copolymerized with other known monomers to form polymeric materials which are useful as coatings and films. Because such polymeric materials contain polar carboxyl groups, they are especially useful as dye receptive, adhesive or antistatic materials. 2-pyrones can also be reacted with ammonia or amines to form 2-pyridones, or with maleic anhydride by Diels-Alder condensation. 2-pyrones have been prepared in the past by relatively inconvenient and expensive processes, e.g. the decarboxylation of the mercuric salt of 2-oxo-1,2-pyran-5-carboxylic acid (coumalic acid).

It has now been found that 2-pyrones can be more conveniently and inexpensively prepared by the thermal isomerization of 2-furaldehydes. Thus, a 2-pyrone can be prepared in accordance with the present invention by a process which comprises heating a 2-furaldehyde to between about 750° and about 1500 ° C. for a fraction of a second, preferably for less than a tenth of a second, and in especially preferred embodiments, for up to about 20 milliseconds (0.02 second), and immediately thereafter cooling the resulting 2-pyrone to a temperature at which it is normally structurally stable.

The process of this invention can be used in the preparation of any of the 2-pyrones represented by the foregoing structural formula, in which the numerals are employed to illustrate the ring-position numbering system used herein for purposes of describing various specific 2-pyrones. Examples of specific 2-pyrones which are obtainable by the present invention include unsubstituted 2-pyrone (also known as alpha-pyrone or coumalin); halo-2-pyrones such as 3-, 4- or 5-fluoro-2-pyrone or 3-, 4- or 5-chloro-2-pyrone; dihalo-2-pyrones such as 3,5-dichloro- or 4-fluoro-5-chloro-2-pyrone, etc.; trihalo-2-pyrones such as 3,4,5-tri-fluoro- or 3-fluoro-4,5-dichloro-2-pyrones, etc.; alkyl and/or alkenyl-2-pyrones in which the alkyl and/or alkenyl group(s) are straight-chain groups, e.g. 3-methyl-, 4-ethenyl-, 5-propyl-, 3,5-dimethyl-, 4-methyl-5-ethyl-, 3-ethenyl-5-propyl-, 3,4,5-trimethyl- or 3-methyl-4-ethenyl-5-ethyl-2-pyrone, etc., and in which each alkyl or alkenyl group preferably contains from one to six carbon atoms; aryl-2-pyrones such as 4-phenyl- or 3,5-diphenyl-2-pyrone, etc.; nitro-2-pyrones such as 3-nitro- or 4,5-dinitro-2-pyrone, etc.; 2-benzopyrone (coumarin); and other di- or tri-substituted 2-pyrones containing dissimilar substituents, e.g. 3-chloro-5-nitro-2-pyrone, 3-phenyl-4-fluoro-2-pyrone, 4-methyl-5-nitro-2-pyrone, 3-fluoro-5-ethenyl-2-pyrone, 3-nitro - 4 - chloro - 5 - ethyl - 2 - pyrone, 3 - nitro - 5,6 - benzo-2-pyrone, 3-propyl-5,6-benzo-2-pyrone, etc.

Any of the 2-pyrones illustrated by the structural formula hereinbefore can be obtained by isomerizing, in accordance with the process of this invention, a 2-furaldehyde having substituents which correspond to those of the desired 2-pyrone product. Thus, the 2-furaldehydes which can be used in the preparation of 2-pyrones by the process of this invention can be represented by the following structural formula:

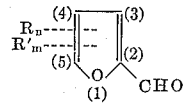

in which R and R' are organic radicals that are stable structurally and against scission from the ring at the reaction conditions of the process of this invention; each R is a monovalent radical linked to ring position 3, 4 or 5; R' is a divalent radical linked to and forming a cyclic, e.g. aromatic, structure with adjacent carbon atoms in two of ring positions 3, 4 and 5; $m$ is zero or one; and $n$ is zero or an integer of one to three when $m$ is zero, and zero or one when $m$ is one. In more specific embodiments in which $n$ is other than zero, each R is a member of the group consisting of the halogens and normal aliphatic, aryl and nitro radicals. In other more specific embodiments in which $m$ is one, R' is a

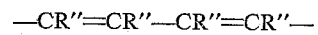

structure which is linked to and forms a benzenoid structure with the carbon atoms in ring positions 4 and 5, and in which R" is a member of the group consisting of hydrogen and monovalent organic radicals that are stable structurally and against scission from the benzenoid ring at the reaction conditions of the process of this invention, e.g. the halogens and normal aliphatic, aryl or nitro radicals.

Although the process of this invention should not be regarded as being limited to any particular rearrangement mechanism, it is believed that the 2-furaldehyde ring is opened between the 1- and 2-positions by the high temperature of the process and then closed by formation of a direct linkage between the oxygen atom occupying the 1-position and the carbon atom formerly of the aldehyde group, with the hydrogen atom of the aldehyde group being transferred to the carbon atom formerly in the 2-position of the 2-furaldehyde starting material and finally in the 3-position of the 2-pyrone product. By virtue of the insertion of an additional carbon atom in the ring by the process of this invention, any substituent originally attached to position 3, 4 or 5 of the 2-furaldehyde starting material will be attached at position 4, 5 or 6, respectively, of the 2-pyrone product.

Thus, the process of this invention includes the following representative isomerization reactions, which are included here only for purposes of illustration and not limitation:

2-furaldehyde→2-pyrone,
3-chloro-2-furaldehyde→4-chloro-2-pyrone,
4-ethyl-2-furaldehyde→5-ethyl-2-pyrone,
4-phenyl-2-furaldehyde→5-phenyl-2-pyrone,
5-nitro-2-furaldehyde→6-nitro-2-pyrone,
3-fluoro-4-nitro-2-furaldehyde→4-fluoro-5-nitro-2-pyrone,
3-phenyl-5-ethynyl-2-furaldehyde→4-phenyl-6-ethenyl-2-pyrone,
4,5-dichloro-2-furaldehyde→5,6-dichloro-2-pyrone,
3,4,5-trimethyl-2-furaldehyde→4,5,6-trimethyl-2-pyrone,
3-fluoro-4-nitro-5-ethyl-2-furaldehyde→4-fluoro-5-nitro-6-ethyl-2-pyrone,
4,5-benzo-2-furaldehyde→5,6-benzo-2-pyrone,
3-propyl-4,5-benzo-2-furaldehyde→4-propyl-5,6-benzo-2-pyrone.

The preferred reaction temperature and time for use with a specific 2-furaldehyde starting material will depend on many variables, e.g. the desired percentage of conversion of the 2-furaldehyde starting material, the desired yield of the 2pyrone product based on converted starting material, the tendency of substituents of the specific 2-furaldehyde starting material to be altered or lost at relatively higher temperatures within the 750–1500° C. range, limitations on the conditions available with the process equipment to be used, etc.

In general, an increase of temperature within the 750–1500° C. range or an increase in the length of time for which the 2-furaldehyde is heated to such temperatures will result in an increase in the percentage of conversion of the starting material. However, relatively higher conversions of a 2-furaldehyde starting material are generally accompanied by relatively lower yields of the 2-pyrone product, based on the amount of converted 2-furaldehyde. It will therefore be generally preferred to carry out the process using a relatively high temperature and a relatively short period of time, or at somewhat lower temperatures for slightly longer periods of time. Since it will be generally desirable to maximize the yield of 2-pyrone based on the amount of starting material used by the process, the preferred reaction conditions will also depend on whether unconverted 2-furaldehyde can be conveniently separated from by-products and recycled.

The temperature to which the reaction products are cooled to stabilize the desired 2-pyrone product and the rate at which such cooling is carried out will also depend on the specific 2-pyrone to be stabilized, the desired yield, equipment limitations, etc. For best results, the reaction products should be cooled to a temperature about 200° C. or more below that which would have been necessary for conversion of a substantial proportion of the 2-furaldehyde starting material to the specific 2-pyrone to be stabilized. Such cooling should be carried out as quickly as practical, preferably within a fraction of a second, e.g. in less than about 20 milliseconds, since further delays in cooling will result in a gradual reduction of the percentage yield of 2-pyrone, based on converted 2-furaldehyde.

Thus, in an embodiment which is preferred for most purposes, and particularly for the preparation of unsubstituted 2-pyrone, the process comprises heating a 2-furaldehyde to between about 900° and about 1200° C. for between about 0.2 and about 5 milliseconds, and immediately thereafter cooling the resulting 2-pyrone to a temperature of about 700° C. or lower.

The reaction can be carried out in any process equipment which can provide the desired reaction times and temperatures. Generally, the 2-furaldehyde starting material will be preheated to a temperature below the desired reaction temperature and then passed through a reactor maintained at a temperature sufficient to heat the starting material to be desired reaction temperature. The flow path through the reactor should be short enough and the flow rate therethrough high enough to provide suitably short reaction times. The reaction zone will preferably be narrow for rapid heating of the starting material, and can be enclosed by any suitable material, e.g. quartz, metal, etc.

The 2-furaldehyde starting material can be passed into the reaction zone in a relatively pure form, or with other reactants. If desired, a suitable carrier gas such as nitrogen or an oxygen-nitrogen mixture can be employed.

Immediately after passage through the reactor, the products of the reaction should be conducted through any means suitable for rapid cooling of the products, e.g. a narrow conduit adapted to rapidly withdraw heat from the products and dissipate it to the atmosphere or to a surrounding cooling medium such as water.

The following are specific examples of the preparation of a 2-pyrone by the process of this invention. It will be understood that the invention is not limited to the specific 2-furaldehyde or to the specific reaction conditions used therein, but that other reaction conditions and other operations and equipment can be used to prepare the same 2-pyrone product, and other 2-furaldehyde starting materials, other reaction conditions and other operations and equipment can be used to prepare other 2-pyrones, as those skilled in the art will readily appreciate.

*Example 1*

A stream of 2-furaldehyde was fed into a nitrogen line by a positive displacement pump. The nitrogen-furaldehyde mixture was preheated to about 200° C. and then passed through a thin-walled quartz liner fitted within a piece of 446 Chromium Steel tubing having an inside diameter of 2 millimeters. The steel tubing was tightly fitted within at two-inch long cylindrical bar of Inconel inductively heated by a water-cooled induction coil activated by a 6 kw. sparkgap converter and insulated from the reaction zone by a cylindrical sheet of mica. Reaction temperature was measured by a thermocouple positioned close to the reactor wall and maintained at 1100±5° C. Reaction products were cooled, metered and analyzed by gas chromatography using a nine-foot column of 30% Silicone Rubber SE 30 on Diaport-S. The column was programmed at 10°/minute from 70° to 300° C. Peak areas were assumed proportional to weight percents in product calculations. The amount of 2-furaldehyde fed to the reaction zone was measured by noting the decrease in the volume of liquid starting material in the pump and corrected by the amount of liquid not recovered when the process was run about 200° C. below that necessary for a detectable reaction. The reaction products were separated and analyzed by infrared spectroscopy, nuclear magnetic resonance and low voltage mass spectroscopy. The fraction identified as 2-pyrone was found to have the properties shown in Table I.

TABLE I.—PRODUCT IDENTIFICATION

| Property | Found | Remarks |
| --- | --- | --- |
| Boiling Point | About 205° C | Reported in literature as 206-209° C. |
| Infrared Spectrum | Two strong bands at 1,723 cm.$^{-1}$ and 1,745 cm.$^{-1}$ | The C=O (stretch) in $\alpha\beta$, $\gamma\delta$-unsaturated $\delta$-lactone produces a band near 1,738 cm.$^{-1}$. |
|  | Strong at 1,255 cm.$^{-1}$ | The C—O—C (stretch) in an ester produces a band at 1,250-1,270 cm.$^{-1}$. |
|  | No. 1,490, 1,400 cm.$^{-1}$ peaks | Furan structure absent. |
| Nuclear magnetic resonance | Two main peaks (with structure)—$\delta=6.89$, $\delta=5.63$. Tetramethyl silane reference; areas were approximately equal. | Qualitatively, peak positions are consistent with structure. |
| Low voltage molecular weight | Parent peak (m./e.)=96 | Molecular weight of 2-pyrone=96. |

The flow rate of the nitrogen-furaldehyde mixture into the reaction zone was varied to observe the effect of residence time in the reaction zone on the percentage conversion of the furaldehyde starting material and on the percentage of 2-pyrone in the conversion products. The results are shown in Table II.

*Example II*

The process was carried out as described in Example I, except that a three-inch long Inconel heat sink and a higher flow rate through the reaction zone were used. The results of three runs, which differed slightly in the conditioning of the reactor, are shown in Table II.

*Example III*

The process was carried out as described in Example II, except that a higher reaction zone temperature (1150±5° C.) was used. The results of four runs, which differed in the conditioning of the reactor, are shown in Table II.

*Example IV*

The process was carried out as described in Example I, except that a six-inch long Inconel heat sink, a lower reaction zone temperature (1000±5° C.) and a higher flow rate through the reaction zone were used. The results are shown in Table II.

*Example V*

The process was carried out as described in Example IV, except that a lower reaction zone temperature (900±5° C.) and a lower flow rate through the reaction zone were used. The results are shown in Table II.

I claim:
1. A process for the preparation of a 2-pyrone having the structural formula:

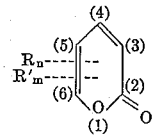

in which R and R' are organic radicals that are stable structurally and against scission from the ring at the reaction conditions of said process; each R is a monovalent radical linked to ring position 4, 5 or 6; R is a radical selected from the group consisting of hydrogen, halogens, nitro, normal alkyls containing 1–6 carbon atoms, normal alkenyls containing 1–6 carbon atoms, and phenyl; R' is a divalent radical having a —CR=CR—CR=CR— structure linked to and forming a cyclic structure with adjacent carbon atoms in two of ring positions 4, 5 and 6, wherein R has the aforedescribed significance; $m$ is zero or one; and $n$ is zero or an integer of one to three when $m$ is zero, and zero or one when $m$ is one; which process comprises heating a 2-furaldehyde having the structural formula:

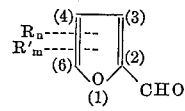

in which R, R', $m$ and $n$ have the aforedescribed significance; each R is linked to ring position 3, 4 or 5; and R' is linked to and forms a cyclic structure with adjacent carbon atoms in two of ring positions 3, 4 and 5; to between about 750° and about 1500° C. for a fraction of

TABLE II.—THERMAL ISOMERIZATION OF 2-FURALDEHYDE TO 2-PYRONE

|  | Reaction zone temperature, ° C. | Residence time in reaction zone, milli-seconds | Conversion of 2-furaldehyde, percent | Yield of 2-pyrone based on amount of 2-furaldehyde converted, percent |
| --- | --- | --- | --- | --- |
| Example I: |  |  |  |  |
| Run 1 | 1,100 | 1.4 | 35 | 10 |
| Run 2 | 1,100 | 3.0 | 43 | 9 |
| Example II: |  |  |  |  |
| Run 3 | 1,100 | 0.5 | 5 | 43 |
| Run 4 | 1,100 | 0.5 | 8 | 25 |
| Run 5 | 1,100 | 0.5 | 10 | 28 |
| Example III: |  |  |  |  |
| Run 6 | 1,150 | 0.5 | 3.5 | 57 |
| Run 7 | 1,150 | 0.5 | 3.5 | 60 |
| Run 8 | 1,150 | 0.5 | 15 | 22 |
| Run 9 | 1,150 | 0.5 | 20 | 17 |
| Example IV: Run 10 | 1,000 | 1.0 | 56 | 7 |
| Example V: Run 11 | 900 | 1.5 | 23 | 8 |

Although the present invention has been described with preferred embodiments, it should be understood that modifications and variations thereof may be employed without departing from the spirit and scope of this invention, as those skilled in the art will readily understand. Such variations and modifications are therefore considered to be within the purview and scope of the appended claims.

a second, and immediately thereafter cooling the resulting 2-pyrone to a temperature at which it is normally structurally stable.

2. A process for the preparation of 2-pyrone, which comprises heating 2-furaldehyde to between about 750° and about 1500° C. for a fraction of a second, and immediately thereafter cooling the resulting 2-pyrone to a temperature at which it is normally structurally stable.

3. A process, as defined in claim 1, in which $n$ is other than zero and each R is a radical selected from the group consisting of hydrogen, halogens, nitro, normal alkyls containing 1–6 carbon atoms, normal alkenyls containing 1–6 carbon atoms, and phenyl.

4. A process, as defined in claim 1, in which the 2-furaldehyde is a 2-benzofuraldehyde and the 2-pyrone is a 5,6-benzo-2-pyrone.

5. A process, as defined in claim 1, in which the 2-furaldehyde is heated to between about 750° and about 1500° C. for less than a tenth of a second.

6. A process, as defined in claim 1, in which the 2-furaldehyde is heated to between about 750° and about 1500° C. for up to about 0.02 second.

7. A process, as defined in claim 1, in which the 2-furaldehyde is heated to between about 900° and about 1200° C.

8. A process, as defined in claim 1, in which the 2-furaldehyde is heated to between about 900° and about 1200° C. for between about 0.2 and about 5 milliseconds.

9. A process for the preparation of 2-pyrone, which comprises heating 2-furaldehyde to between about 900° and about 1200° C. for between about 0.2 and about 5 milliseconds, and immediately thereafter cooling the resulting 2-pyrone to a temperature below about 700° C.

10. A process, as defined in claim 1, in which $m$ is 0, $n$ is an integer from 1 to 3, R is a radical selected from the group consisting of halogens, nitro, and alkyls containing 1–3 carbon atoms.

No references cited.

ALEX MAZEL, *Primary Examiner.*

JOSEPH A. NARCAVAGE, *Assistant Examiner.*

UNITED STATES PATENT OFFICE
CERTIFICATE OF CORRECTION

Patent No. 3,318,912　　　　　　　　　　　　　　　May 9, 1967

Eric J. Y. Scott

It is hereby certified that error appears in the above numbered patent requiring correction and that the said Letters Patent should read as corrected below.

Column 6, lines 39 to 42, for that portion of the formula reading "(6)" read -- (5) --.

Signed and sealed this 29th day of October 1968.

(SEAL)
Attest:

Edward M. Fletcher, Jr.　　　　　　　　　　　　　EDWARD J. BRENNER
Attesting Officer　　　　　　　　　　　　　　　　Commissioner of Patents